United States Patent [19]
Yoshioka

[11] Patent Number: 5,814,684
[45] Date of Patent: Sep. 29, 1998

[54] ANTI-FOGGING AGENT FOR THERMOPLASTIC RESIN SURFACE AND ANTI-FOGGING THERMOPLASTIC RESIN SHEET

[75] Inventor: Shuji Yoshioka, Hyogo, Japan

[73] Assignee: Daicel Chemical Industries, Ltd., Osaka, Japan

[21] Appl. No.: 539,785

[22] Filed: Oct. 5, 1995

[30] Foreign Application Priority Data

Oct. 5, 1994 [JP] Japan .................................. 6-241215

[51] Int. Cl.⁶ .............................. C09K 3/16; C09K 3/18
[52] U.S. Cl. ............................ 523/169; 524/28; 524/47; 524/56; 524/57; 524/503; 428/424.2
[58] Field of Search ............................ 523/169; 524/47, 524/56, 57, 503, 28; 428/424.2

[56] References Cited

FOREIGN PATENT DOCUMENTS

| | | |
|---|---|---|
| 53-115781 | 10/1978 | Japan . |
| 59-19584 | 5/1984 | Japan . |
| 598054 | 4/1993 | Japan . |

*Primary Examiner*—Marion E. McCamish
*Assistant Examiner*—John J. Guarriello
*Attorney, Agent, or Firm*—Sughrue, Mion, Zinn, Macpeak & Seas, PLLC

[57] ABSTRACT

The present invention provides an anti-fogging agent for the surface of a thermoplastic resin sheet which exerts the following excellent effects:

(1) The effect of inhibiting fogging on the surface of the sheet due to the condensation of vapor can last over an extended period of time;

(2) Excellent blocking resistance and coating stability make the anti-fogging surface less peelable in the procedure of heating it over a heating plate in a direct heating process so that it is formed into various shapes; and (3) The incorporation of a polyvalent alcohol having wetting properties in a predetermined amount provides excellent antistatic properties. The present invention provides an anti-fogging thermoplastic resin sheet treated with the foregoing anti-fogging agent. A novel anti-fogging agent for the surface of a thermoplastic resin sheet is provided, comprising a polyvalent alcohol incorporated therein in an amount of from 1 to 15 parts by weight based on 100 parts by weight of a mixture of a sucrose aliphatic ester and a coat-forming hydrophilic polymeric compound. A novel anti-fogging thermoplastic resin sheet treated with the foregoing anti-fogging agent is also provided.

10 Claims, 1 Drawing Sheet

ANTI-FOGGING AGENT FOR THERMOPLASTIC RESIN SURFACE AND ANTI-FOGGING THERMOPLASTIC RESIN SHEET

FIELD OF THE INVENTION

The present invention relates to a treatment agent for the surface of a thermoplastic resin sheet which forms a coat having excellent anti-fogging properties. The present invention also relates to an anti-fogging thermoplastic resin sheet.

BACKGROUND OF THE INVENTION

It is described in JP-B-59-19584 (The term "JP-B" as used herein means an "examined Japanese patent publication") that it has heretofore been practicable to use a coating solution comprising a mixture of a surface active agent having HLB of not less than 13 and a sucrose aliphatic ester in order to provide a thermoplastic resin sheet with anti-fogging properties. However, this technique is disadvantageous in that one sheet is subject to blocking with another. Further, the use of a surface active agent having a high HLB is disadvantageous in that water content in the coating agent is evaporated due to sudden temperature rise during the formation of vessel, occasionally destroying the appearance of the formed product.

JP-A-53-115781 proposes that a sheet is subjected to corona discharge treatment, and then coated with an anti-fogging agent and a silicone oil. However, this technique is disadvantageous in that the desired anti-fogging properties last over a period of time as short as about 30 minutes. Thus, products obtained by deep draw forming exhibit impaired anti-fogging properties. Further, this technique is disadvantageous in that it exerts an insufficient antistat effect, causing dusts to be attached to formed products.

SUMMARY OF THE INVENTION

It is therefore an object of the present invention to provide an anti-fogging agent for the surface of a thermoplastic resin sheet which exerts the following excellent effects:

(1) The effect of inhibiting fogging on the surface of the sheet due to the condensation of vapor can last over an extended period of time;

(2) Excellent blocking resistance and coating stability make the anti-fogging surface less peelable in the procedure of heating it over a heating plate in a direct heating process so that it is formed into various shapes; and (3) The incorporation of a polyvalent alcohol having wetting properties in a predetermined amount provides excellent antistatic properties.

It is another object of the present invention to provide an anti-fogging thermoplastic resin sheet treated with the foregoing anti-fogging agent.

As a result of extensive studies, the inventors found that the incorporation of a polyvalent alcohol in an amount of from 1 to 15 parts by weight based on 100 parts by weight of a mixture of a sucrose aliphatic ester and a coat-forming hydrophilic polymeric compound can provide an anti-fogging agent for thermoplastic resin sheet and an anti-fogging thermoplastic resin sheet which can accomplish the foregoing objects of the present invention. It was also found that the present invention can provide sufficient enhancement of the appearance and peelability of formed products besides the objects of the present invention.

BRIEF DESCRIPTION OF THE DRAWINGS

By way of example and to make the description more clear, reference is made to the accompanying drawings in which.

DETAILED DESCRIPTION OF THE INVENTION

Figure 1:
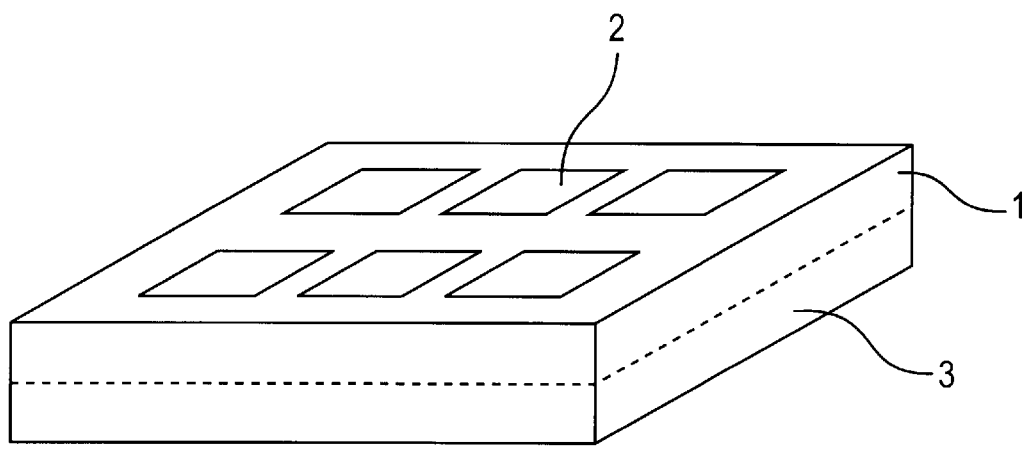
FIG. 1 illustrates an apparatus for the evaluation of low temperature anti-fogging properties comprising a plastic vessel 1 having an opening portion 2 at the top thereof, filled with 20° C. water 3, which is arranged such that a sheet and a vessel of the present invention are disposed in said opening portion 2 for evaluation of anti-fogging properties.

Though the sucrose aliphatic ester mixture of the present invention is not particularly limited, it is preferably comprises an ester of a higher fatty acid having from 6 to 22 carbon atoms and a sucrose in a molarity of not less than 50%. Examples of the higher fatty acid include capric acid, lauric acid, myristic acid, palmitic acid, stearic acid, oleic acid and linoleic acid. Examples of the sucrose aliphatic ester include monoester, diester and triester. The content of such a monoester is preferably not less than 50 mol %. In order to solubilize sucrose laurate or ester mixture in water, it may be mixed with water in the form of solution in a solvent such as ethanol and isopropyl alcohol.

Examples of the coat-forming hydrophilic polymeric compound include protein, starch, polyacrylic acid, sodium polyacrylate, polyacrylamide, polyethylene oxide, polyvinyl pyrrolidone, polyvinyl alcohol, polyvinylamide, polyamine, alginic acid, alginic acid salt, carboxymethylcellulose, hydroxyethylcellulose and hydroxypropylcellulose. In particular, a hydroxyethylcellulose having the following structural formula is water-soluble and can be easily handled.

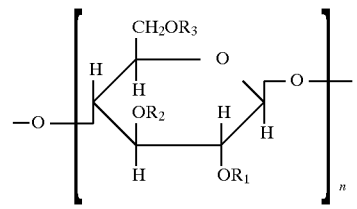

wherein $R_1$, $R_2$ and $R_3$ each represent $(CH_2CH_2O)_mH$ (in which m represents an integer of from 0 or more, with the proviso that $R_1$, $R_2$ and $R_3$ are not H at the same time); and n represents a number of 1 or more.

The proportion of the sucrose aliphatic ester to the coat-forming hydrophilic polymeric compound is from 20 to 80 parts by weight, preferably from 40 to 60 parts by weight based on 100 parts by weight of the high molecular compound.

If the proportion of the sucrose aliphatic ester falls below 20 parts by weight, the resulting anti-fogging properties are insufficient. If the proportion of the sucrose aliphatic ester exceeds 80 parts by weight, it disadvantageously renders the surface of the sheet sticky and it is not fit for practical use.

Though the polyvalent alcohol employable in the present invention is not particularly limited, a straight or cyclic chain hydrophilic polyvalent alcohol having from 2 to 8 carbon atoms, preferably from 4 to 6 carbon atoms is preferable. Examples of the hydrophilic polyvalent alcohol include propylene glycol, glycerin, D-sorbitol, D-xylose, and D-mannitol. Particularly preferred among these polyvalent alcohols is D-sorbitol, which can also serve as a food additive and exhibits water solubility and wetting properties to exert an excellent antistat effect.

The proportion of the polyvalent alcohol is from 1 to 15 parts by weight, preferably from 5 to 10 parts by weight based on 100 parts by weight of the mixture of sucrose aliphatic ester and coat-forming hydrophilic polymeric compound.

If the proportion of the polyvalent alcohol falls below 1 part by weight, the wetting effect exerted by the polyvalent alcohol is insufficient, making it impossible to provide a sufficient antistat effect. On the contrary, if the proportion of the polyvalent alcohol exceeds 15 parts by weight, the wetting properties provided by the polyvalent alcohol is excessive, causing one sheet to be blocked to another under high humidity and temperature conditions.

The thermoplastic resin sheet to which the present invention can be applied is not specifically limited. For example, polyethylene, polypropylene, polystyrene, rubber-reinforced polystyrene, acrylonitrile-styrene copolymer, 6-nylon, 6,6-nylon, 12-nylon, polyethylene terephthalate, polymethyl methacrylate, polyacrylonitrile, etc. may be used singly. Alternatively, two or more of these materials which are well compatible with each other may be used in admixture. Alternatively, a copolymer of these materials may be used. Further, various sheets obtained by biaxial stretching method, inflation method, co-extrusion method or lamination method may be used.

Though the process for preparing the anti-fogging agent of the present invention is not particularly limited, one of the process is the following. To a solvent such as water or a mixture of water and alcohol, a mixture of a sucrose aliphatic ester and a coat-forming hydrophilic polymeric compound, and a polyvalent alcohol are dispersed or dissolved in an amount of from 0.3 to 2%, preferably from 0.5 to 1% as the solid content.

Though the coating method of the present invention is not particularly limited, roll coater, gravure coater, knife coater, spray coater, immersion and the like are employed.

The amount of the anti-fogging agent of the present invention to be applied to the thermoplastic resin sheet must be from 0.01 to 2 g/m², preferably from 0.02 to 0.5 g/m² as calculated in terms of solid content (The term "solid content" as used herein means a mixture of sucrose aliphatic ester, hydrophilic polymeric compound and polyvalent alcohol dissolved in water or ethanol).

If the amount of the solid content left on the surface of the sheet falls below 0.01 g/m², the resulting anti-fogging properties are insufficient. On the contrary, if the solid content is used in an amount of over 2 g/m², it disadvantageously renders the surface of the sheet sticky or causes blocking.

The present invention will be further described in the following examples, but the present invention should not be construed as being limited thereto.

The anti-fogging properties, blocking resistance and antistatic properties as used herein were determined as follows:
Low temperature anti-fogging properties: A plastic vessel for the evaluation of low temperature anti-fogging properties was filled with 20° C. water. A sheet coated with an anti-fogging agent of the present invention was then stuck on the vessel. The vessel was then allowed to stand in a 5° C. refrigerator (see FIG. 1). Thereafter, the sheet and the vessel were visually evaluated for fogging.

Figure 2:
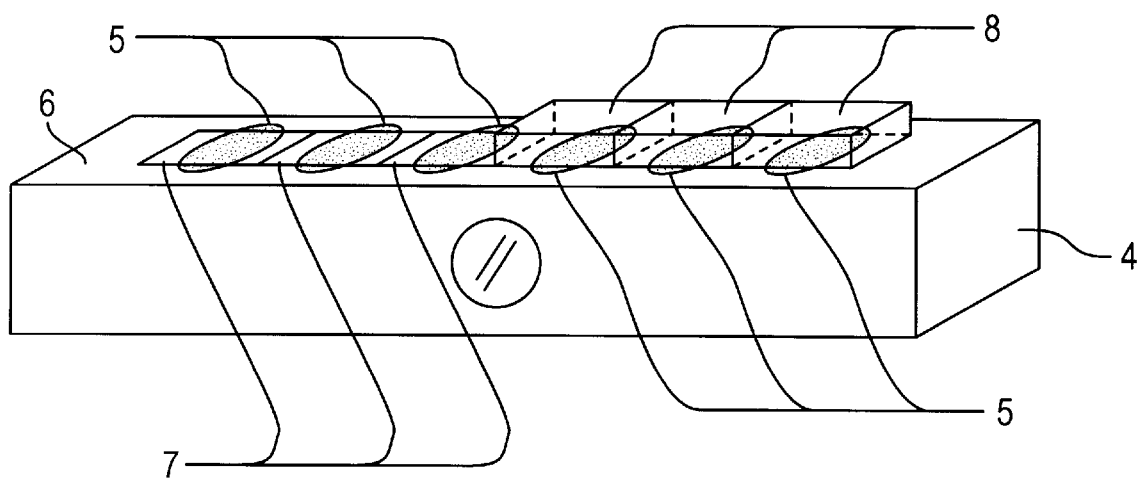
FIG. 2 illustrates an apparatus for the evaluation of high temperature anti-fogging properties comprising a water bath 4 covered at the top thereof by a lid 6 having an opening portion 5, kept at a temperature of 80° C., which is arranged such that it is allowed to stand in a 5° C. refrigerator with a sheet 7 and vessel 8 of the present invention disposed in said opening portion 5 for evaluation of anti-fogging properties, wherein the reference numerals 1, 2, 3, 4, 5, 6, 7 and 8 indicate plastic vessel, opening portion, water, water bath, opening portion, lid, sheet of the present invention and vessel of the present invention, respectively.

High temperature anti-fogging properties: The sheet coated with an anti-fogging agent of the present invention and the plastic vessel were allowed to stand over a water bath which had been heated to a temperature of 80° C. (see FIG. 2), and then visually evaluated for fogging.

The criterion for anti-fogging properties comprises the following four levels:
E (excellent) . . . No fogging observed
G (good) . . . No fogging observed but many large water droplets observed
SP (slightly poor) . . . Fogged with small water droplets on less than 20% of anti-fogged area, thus opacified
P (poor) . . . Entirely fogged with small water droplets, thus opacified Blocking resistance: Ten sheets of A4 size resin sheets were stacked. The stack was then allowed to stand under a load of 10 kg over the entire surface thereof for 12 hours. Thereafter, the stack of ten sheets of A4 size resin sheets was divided into 100 sections. These sections were visually evaluated for the proportion of blocked pattern in A4 size. The criterion for evaluation comprises the following four levels:
E (excellent): Blocked pattern area falls below 5%
G (good): Blocked pattern area ranges from 5% to 25%
SP (slightly poor): Blocked pattern area range from 25% to 50%
P (poor): Blocked pattern area exceeds 50%

Antistatic properties: The sheet was measured for surface resistivity Rs ($\Omega$) on the treated surface thereof in accordance with ASTM-D-257. The leakage of static electricity on the treated surface of the sheet was evaluated by measuring the half-life of static electricity at a temperature of 23° C. and a humidity of 60% RH with STATIC HONESTOMETER. The criterion for evaluation is set forth in Table 1.

EXAMPLE 1

70 parts by weight of hydroxyethylcellulose as a coat-forming hydrophilic polymeric compound (HEC-SE400, available from Daicel Chemical Industries, Ltd.), 30 parts by weight of DK ester S-L18 (available from Daiichi Kogyo Seiyaku) as a sucrose aliphatic ester, and 10 parts by weight of a polyvalent alcohol (D-sorbitol, available from Kao Corp.) were diluted with water to make a solution having a solid concentration of 1%. The solution thus obtained was thoroughly agitated by a high speed agitating element to obtain a coating composition. This treatment solution was then spray-coated onto a 180-$\mu$m thick biaxially-stretched polystyrene sheet (hereinafter referred to as "OPS") which had been subjected to corona discharge treatment. The anti-fogging properties, blocking resistance and antistatic properties of the sheet thus obtained and the anti-fogging properties, antistatic properties and appearance of the formed product of the sheet are set forth in Tables 3 to 6.

EXAMPLE 2

An experiment was conducted in the same manner as in Example 1 except that the mixing proportion of the various components were altered as set forth in Table 2. The properties of the sheet and vessel thus obtained are set forth in Tables 3 to 6.

EXAMPLE 3

An experiment was conducted in the same manner as in Example 1 except that the mixing proportion of the various components were altered as set forth in Table 2. The properties of the sheet and vessel thus obtained are set forth in Tables 3 to 6.

Comparative Example 1

A treatment solution was prepared in the same manner as in Example 1 except that an ethylene oxide adduct of sorbitan oleate and sucrose laurate were used in a weight ratio of 5:1 as the solid content. The treatment solution thus obtained was then applied to the foregoing OPS and vessel. The properties of the sheet and vessel thus obtained are set forth in Tables 3 to 6.

Comparative Example 2

A treatment solution was prepared in the same manner as in Example 1 except that an ethylene oxide adduct of sorbitan oleate and silicone oil were used in a weight ratio of 5:1 as the solid content. The treatment solution thus obtained was then applied to the foregoing OPS and vessel. The properties of the sheet and vessel thus obtained are set forth in Tables 3 to 6.

Comparative Example 3

An experiment was conducted in the same manner as in Example 1 except that the mixing proportion of the various components were altered as set forth in Table 2. The properties of the sheet and vessel thus obtained are set forth in Tables 3 to 6.

As mentioned above, the present invention relates to an anti-fogging agent comprising a polyvalent alcohol incorporated therein in an amount of from 1 to 15 parts by weight based on 100 parts by weight of a mixture of a sucrose aliphatic ester and a coat-forming hydrophilic polymeric compound. The present invention also relates to an anti-fogging thermoplastic resin sheet treated with such an anti-fogging agent. The treatment solution of the present invention exhibits excellent wetting properties at the surface and thus can be uniformly applied without forming water droplets. As a result, the formed products thus treated show extremely remarkable improvements in its anti-fogging properties, blocking resistance and antistatic properties. Further, the anti-fogging agent of the present invention can be applied even in usage requiring transparency without impairing the transparency inherent to the base resin. Moreover, sucrose laurate and D-sorbitol, which are essential components of the anti-fogging agent, can be also used as food additives. Hydroxyethylcellulose meets the regulations on raw materials of cosmetics. Thus, the anti-fogging agent of the present invention can be used for food vessel, food film, etc. to advantage.

TABLE 1

(Criterion for evaluation of antistatic properties: evaluated at a temperature of 23° C. and a humidity of 60% RH)

| Symbol | Specific surface resistivity Rs (Ω) | Half life by HONESTMETER t (sec) |
| --- | --- | --- |
| E | $Rs < 1 \times 10^{11}$ | $t < 5$ |
| G | $1 \times 10^{11} \leq Rs < 1 \times 10^{12}$ | $5 \leq t < 30$ |
| SP | $1 \times 10^{12} \leq Rs < 1 \times 10^{13}$ | $30 \leq t < 60$ |
| P | $1 \times 10^{14} \leq Rs$ | $60 \leq t$ |

TABLE 2

| Example No. | Solid content on sheet surface (g/m²) | Hydroxyethyl-cellulose | Sucrose aliphatic ester | D-sorbitol | Ethylene oxide adduct of sorbitan oleate | Silicone oil |
| --- | --- | --- | --- | --- | --- | --- |
| Example 1 | 0.055 | 70 | 30 | 10 | — | — |
| Example 2 | 0.055 | 50 | 50 | 10 | — | — |
| Example 3 | 0.055 | 30 | 70 | 10 | — | — |
| Comparative Example 1 | 0.060 | — | 20 | — | 100 | — |
| Comparative Example 2 | 0.060 | — | — | — | 100 | 20 |
| Comparative Example 3 | 0.050 | 50 | 50 | — | — | — |

TABLE 3

(Evaluation of anti-fogging properties)

| Shape Evaluation method | Sheet | | | | | | Vessel | | | | | |
| --- | --- | --- | --- | --- | --- | --- | --- | --- | --- | --- | --- | --- |
| | Low temperature anti-fogging properties (hr.) | | | High temperature anti-fogging properties (sec.) | | | Low temperature anti-fogging properties (hr.) | | | High temperature anti-fogging properties (sec.) | | |
| Measuring time | 0.5 | 3.0 | 24.0 | 10 | 30 | 60 | 0.5 | 3.0 | 24.0 | 10 | 30 | 60 |
| Example 1 | E | E | E | E | E | E | E | E | E | E | E | E |
| Example 2 | E | E | E | E | E | E | E | E | E | E | E | E |
| Example 3 | E | E | E | E | E | E | E | E | E | E | E | E |
| Comparative Example 1 | G | G | G | G | SP | SP | G | SP | P | P | P | P |

TABLE 3-continued (Evaluation of anti-fogging properties)

| | Sheet | | | | | | Vessel | | | | | |
|---|---|---|---|---|---|---|---|---|---|---|---|---|
| Shape Evaluation method | Low temperature anti-fogging properties (hr.) | | | High temperature anti-fogging properties (sec.) | | | Low temperature anti-fogging properties (hr.) | | | High temperature anti-fogging properties (sec.) | | |
| Comparative Example 2 | G | P | P | G | P | P | SP | SP | P | SP | P | P |
| Comparative Example 3 | SP | G | E | E | E | E | SP | G | E | E | E | E |

TABLE 4

(Blocking resistance)

| Example No. | Sheet Blocking resistance |
|---|---|
| Example 1 | E |
| Example 2 | E |
| Example 3 | E |
| Comparative Example 1 | P |
| Comparative Example 2 | P |
| Comparative Example 3 | E |

TABLE 5

| | Sheet | |
|---|---|---|
| Example No. | Specific surface resistivity (Ω) | Half life by HONESTMETER (sec.) |
| Example 1 | E | E |
| Example 2 | E | E |
| Example 3 | E | E |
| Comparative Example 1 | P | SP |
| Comparative Example 2 | P | P |
| Comparative Example 3 | G | G |

TABLE 6

| | Vessel | |
|---|---|---|
| Example No. | Specific surface resistivity (Ω) | Half life by HONESTMETER (sec.) |
| Example 1 | G | G |
| Example 2 | G | E |
| Example 3 | E | E |
| Comparative Example 1 | P | P |
| Comparative Example 2 | P | P |
| Comparative Example 3 | P | SP |

While the invention has been described in detail and with reference to specific embodiments thereof, it will be apparent to one skilled in the art that various changes and modifications can be made therein without departing from the spirit and scope thereof.

What is claimed is:

1. An anti-fogging agent for the surface of a thermoplastic resin sheet, comprising a polyvalent alcohol incorporated therein in an amount of from 1 to 15 parts by weight based on 100 parts by weight of a mixture of a sucrose aliphatic ester mixture-and a coat-forming hydrophilic polymeric compound.

2. The anti-fogging agent for the surface of a thermoplastic resin sheet according to claim 1, wherein the mixing ratio of said sucrose aliphatic ester to said coat-forming hydrophilic polymeric compound is from 20 to 80 parts by weight based on 100 parts by weight of said hydrophilic polymeric compound.

3. The anti-fogging agent for the surface of a thermoplastic resin sheet according to claim 1, wherein an ester of a higher fatty acid having from 6 to 22 carbon atoms and a sucrose, as said sucrose aliphatic ester mixture, is contained in a molarity of not less than 50%.

4. The anti-fogging agent for the surface of a thermoplastic resin sheet according to claim 3, wherein said sucrose aliphatic ester is a sucrose laurate.

5. The anti-fogging agent for the surface of a thermoplastic resin sheet according to claim 1, wherein said hydrophilic polymeric compound is selected from the group consisting of protein, starch, polyacrylic acid, sodium polyacrylate, polyacrylamide, polyethylene oxide, polyvinyl pyrrolidone, polyvinyl alcohol, polyvinylamide, polyamine, alginic acid, alginic acid salt, carboxymethylcellulose, hydroxyethylcellulose and hydroxypropylcellulose.

6. The anti-fogging agent for the surface of a thermoplastic resin sheet according to claim 5, wherein said hydrophilic polymeric compound is hydroxyethylcellulose having the following structural formula:

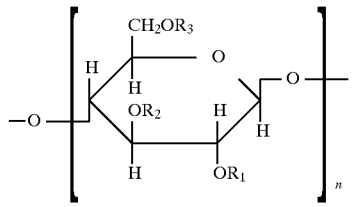

wherein $R_1$, $R_2$ and $R_3$ each represent $(CH_2CH_2O)_mH$ (in which m represents an integer of from 0 or more, with the proviso that $R_1$, $R_2$ and $R_3$ are not H at the same time); and n represents a number of 1 or more.

7. The anti-fogging agent for the surface of a thermoplastic resin sheet according to claim 1, wherein said polyvalent alcohol is a straight or cyclic chain hydrophilic polyvalent alcohol having 2 to 8 carbon atoms.

8. The anti-fogging agent for the surface of a thermoplastic resin sheet according to claim 1, wherein said polyvalent alcohol is D-sorbitol.

9. A thermoplastic resin sheet, having an anti-fogging agent according to any one of claims 1 to 8 applied to at least one side thereof.

10. The thermoplastic resin sheet according to claim 9, wherein the coated amount of said anti-fogging agent is from 0.01 to 2 $g/m^2$ as calculated in terms of solid content.

* * * * *